US007033723B2

(12) United States Patent
Aylward et al.

(10) Patent No.: US 7,033,723 B2
(45) Date of Patent: Apr. 25, 2006

(54) SURFACE ROUGHNESS FREQUENCY TO CONTROL PITS ON FOAM CORE IMAGING SUPPORTS

(75) Inventors: Peter T. Aylward, Hilton, NY (US); Narasimharao Dontula, Rochester, NY (US); Sandra J. Dagan, Churchville, NY (US); Thaddeus S. Gula, Rochester, NY (US); Terry A. Heath, Caledonia, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/788,964

(22) Filed: Feb. 27, 2004

(65) Prior Publication Data

US 2005/0191568 A1 Sep. 1, 2005

(51) Int. Cl.

| | |
|---|---|
| ***G03C 1/765*** | (2006.01) |
| ***G03C 1/93*** | (2006.01) |
| ***B32B 5/20*** | (2006.01) |
| ***B32B 27/00*** | (2006.01) |
| ***B29C 47/00*** | (2006.01) |

(52) U.S. Cl. ...................... 430/201; 430/496; 430/531; 430/536; 428/32.17; 428/32.2; 428/305.5; 428/318.8; 428/319.3; 156/244.11; 156/244.23; 156/244.24; 156/244.27

(58) Field of Classification Search ................ 430/201, 430/496, 531, 536; 428/32.17, 32.2, 305.5, 428/318.8, 319.3; 156/244.11, 244.23, 244.24, 156/244.27

See application file for complete search history.

(56) References Cited

U.S. PATENT DOCUMENTS 3,299,192 A 1/1967 Lux
3,398,035 A * 8/1968 Cleereman et al. .... 156/244.24
3,864,444 A 2/1975 Johnson
4,098,941 A 7/1978 Johnson
4,456,571 A 6/1984 Johnson
4,832,775 A 5/1989 Park et al.
5,084,334 A 1/1992 Hamano et al.
5,277,852 A 1/1994 Spydevold
5,667,740 A 9/1997 Spydevold
5,674,442 A 10/1997 Morita (Continued)

FOREIGN PATENT DOCUMENTS

EP 1 285 741 A1 2/2003

(Continued)

OTHER PUBLICATIONS

EP01890228.8 application, filed Jul. 2, 2001, now publication EP1285741A1.

(Continued)

*Primary Examiner*—Richard L. Schilling
(74) *Attorney, Agent, or Firm*—Lynne M. Blank

(57) ABSTRACT

The present invention relates to an imaging element comprising an imaging layer and a support, wherein the support comprises a core layer having a surface roughness of at least 1.4 microns and a pit camouflaging flange layer between the support and the imaging layer. The present invention also relates to a method of forming an imaging support comprising extruding a polymer layer onto a core layer of surface roughness of at least 1.4 microns, and passing the extruded polymer layer on the core layer between two temperature controlled rollers, one of which comprises a pit camouflaging surface and a method of forming an imaging support comprising extruding a polymer layer, passing the extruded polymer layer between two temperature controlled rollers, one of which comprises a pit camouflaging surface, and laminating the polymer layer onto a core layer with a surface roughness of at least 1.4 microns.

30 Claims, 1 Drawing Sheet

COMPARE GLOSSY AND MATTE CHILL ROLL SPECTRUM

U.S. PATENT DOCUMENTS

| | | | |
|---|---|---|---|
| 5,851,651 A | 12/1998 | Chao | |
| 5,866,282 A | 2/1999 | Bourdelais et al. | |
| 6,077,065 A | 6/2000 | Sumiyoshi et al. | |
| 6,419,778 B1 * | 7/2002 | Miyake et al. | 156/222 |
| 6,447,976 B1 | 9/2002 | Dontula et al. | |
| 6,514,659 B1 | 2/2003 | Dontula et al. | |
| 6,514,660 B1 | 2/2003 | Majumdar et al. | |
| 6,537,656 B1 | 3/2003 | Dontual et al. | |
| 6,566,033 B1 | 5/2003 | Majumdar et al. | |
| 2003/0031747 A1 | 2/2003 | Becker | |
| 2003/0031748 A1 | 2/2003 | Becker | |
| 2003/0036479 A1 | 2/2003 | Majumdar et al. | |
| 2003/0073577 A1 | 4/2003 | Majumdar et al. | |
| 2003/0118750 A1 | 6/2003 | Bourdelais et al. | |
| 2003/0118807 A1 | 6/2003 | Laney et al. | |
| 2003/0123150 A1 | 7/2003 | Brickey et al. | |
| 2003/0128313 A1 | 7/2003 | Kaminsky et al. | |
| 2003/0152760 A1 | 8/2003 | Lai et al. | |
| 2003/0203184 A1 * | 10/2003 | Sunderrajan et al. | 428/317.9 |
| 2003/0219610 A1 | 11/2003 | Aylward et al. | |
| 2003/0219663 A1 | 11/2003 | Sunderrajan et al. | |
| 2003/0232188 A1 | 12/2003 | Savage et al. | |

FOREIGN PATENT DOCUMENTS

| | | |
|---|---|---|
| EP | 0 838 321 B1 | 12/2003 |
| JP | 2839905 B2 | 12/1998 |
| JP | 3308733 B2 | 7/2002 |
| WO | 99/12722 | 3/1999 |

OTHER PUBLICATIONS

Japanese Abstract JP04-327937.

Japanese Abstract JP08-132415.

Japanese Abstract JP09-106038.

Japanese Abstract JP09-127648.

Japanese Abstract JP10-249915.

Japanese Abstract JP11-023814.

To RC or Not to RC, Crawford, Gray and Parsons, Journal of Photographic Engineering, pp. 110-117 (1979).

Co-pending U.S. Appl. No. 10/789,871, Aylward et al., *Polymer Foam Surface Smoothing Materials And ethod*, (D-85377).

* cited by examiner

POWER SPECTRUM ANALYSIS OF THE SURFACES UNDER THE EMULSION FOR TYPICAL PHOTOGRAPHIC PAPER BASE AND ENTIRELY PLASTIC FOAMED SUPPORTS

COMPARE GLOSSY AND MATTE CHILL ROLL SPECTRUM

SURFACE ROUGHNESS FREQUENCY TO CONTROL PITS ON FOAM CORE IMAGING SUPPORTS

CROSS-REFERENCE TO RELATED APPLICATIONS

Reference is made to commonly assigned, co-pending U.S. patent application Ser. No. 10/789,871 by Aylward et al. filed of even date herewith entitled "Polymer Foam Surface Smoothing Materials And Method", the disclosure of which is incorporated herein.

FIELD OF THE INVENTION

This invention relates to imaging media. In a preferred form, it relates to supports for photographic, ink jet, thermal, and electrophotographic media.

BACKGROUND OF THE INVENTION

In order for a print imaging support to be widely accepted by the consumer for imaging applications, it has to meet requirements for preferred basis weight, caliper, stiffness, smoothness, gloss, whiteness, and opacity. Supports with properties outside the typical range for 'imaging media' suffer low consumer acceptance. In addition to these fundamental requirements, imaging supports are also subject to other specific requirements depending upon the mode of image formation on the support. These requirements include penetration by liquid processing chemicals, ready wettability by ink, quick drying and the ability to maximize transfer of dye from the donor, which results in a higher color saturation. Other properties, such as recyclability and resistance to curl, are desired for imaging supports.

It is important for an imaging media to simultaneously satisfy several requirements. One commonly used techniques in the art for simultaneously satisfying multiple requirements includes the use of composite structures comprising multiple layers. However, multiple operations are required to manufacture and assemble all of the individual layers. There is a need for imaging supports that can be manufactured in a single in-line manufacturing process while still meeting the stringent features and quality requirements of imaging supports.

The stringent and varied requirements of imaging media demand a constant evolution of material and processing technology. One such technology, known in the art as 'polymer foams', has previously found significant application in food and drink containers, packaging, furniture, and appliances. Polymer foams have also been referred to as cellular polymers, foamed plastic, or expanded plastic. Polymer foams are multiple phase systems comprising a solid polymer matrix that is continuous and a gas phase. For example, U.S. Pat. No. 4,832,775 discloses a composite foam/film structure which comprises a polystyrene foam substrate, oriented polypropylene film applied to at least one major surface of the polystyrene foam substrate, and an acrylic adhesive component securing the polypropylene film to the major surface of the polystyrene foam substrate. The foregoing composite foam/film structure can be shaped by conventional processes, such as thermoforming, to provide numerous types of useful articles including cups, bowls, and plates, as well as cartons and containers, that exhibit excellent levels of puncture, flex-crack, crease and abrasion resistance, moisture barrier properties, and resiliency.

Foams have also found application in imaging media. For example, JP 2839905 B2 discloses a 3-layer structure comprising a foamed polyolefin layer on the image-receiving side, raw paper base, and a polyethylene resin coat on the backside. The disclosure of JP 09127648 A highlights a variation of the JP 2839905 B2 structure, in which the resin on the backside of the paper base is foamed, while the image receiving side resin layer is unfoamed. Another variation is a 4-layer structure, highlighted in JP 09106038 A, in which the image receiving resin layer comprises 2 layers, an unfoamed resin layer which is in contact with the emulsion, and a foamed resin layer which is adhered to the paper base. Means of making foam core imaging elements, including glossy-surfaced elements, are disclosed in U.S. Pat. Nos. 6,537,656, 6,447,976, 6,566,033 and 6,514,659 and U.S. Application Publications 2003/0219663, 2003/0219610, 2003/0152760, 2003/0128313, 2003/0118750, 2003/0123150, 2003/0118807 and 2003/0118750. These imaging elements possess the typical surface roughness of conventional imaging elements, that is, these elements have a surface feature range of between 0.1 and 1.1 microns.

In the case of resin coated photographic prints, the layer immediately below the emulsion has a large impact on the image sharpness of the print due to the scattering of light during exposure of the print paper to the negative, as disclosed in To RC or Not to RC, Crawford, Gray and Parsons, Journal of Applied Photographic Engineering, 110–117 (1979). Large amounts of $TiO_2$, in the 10 to 15 percent range or higher, are added to this layer to enhance image sharpness and, in turn, hiding power and opacity of the imaging support. Given the fact that ink jet, thermal, and most high end imaging media were derived from and are now in competition with photographic imaging media, the need for comparable degrees of opacity become necessary.

Foamed materials utilized as reflective support suffer from surface pits, especially when the foamed material is plastic coated on the side that will be used for the imaging layer. Pits are defects that first appear at the surface of a polycoated layer after lamination on relatively smooth or "glossy" chill rolls. During high-speed coating, trapped air between the chill roll and the plastic coating leaves a surface hole, creating a smooth and rounded defect. Later emulsion-coating operations replicate the hole into the emulsion layer. Specular illumination of the imaged side causes these emulsion defects to reflect points of brilliance, a distraction when viewing dark areas on the print.

Unfortunately, the typical foam composite imaging material that meets the requirements of an imaging support has naturally more surface roughness at the spatial frequencies that correspond with the size of pits. The control of the surface roughness of the foam core is difficult, as foamed polymer sheet surfaces are prone to pits, resulting in pits in the image unless high levels of polymer layers are coated on top to smooth the surface. There remains a need for improved foam core imaging elements than those disclosed in the prior art.

PROBLEM TO BE SOLVED BY THE INVENTION

There remains a need for foam-cored imaging supports that can be manufactured in a single in-line, environmentally friendly, manufacturing process while still meeting the stringent features and quality requirements of imaging supports, such as stiffness, opacity, curl sensitivity, and optical properties such as sharpness.

SUMMARY OF THE INVENTION

The present invention relates to an imaging element comprising at least one imaging layer and a support, wherein the support comprises a core layer having a surface roughness of at least 1.4 microns and at least one pit camouflaging flange layer between the support and the imaging layer. The present invention also relates to a method of forming an imaging support comprising the steps of extruding a polymer layer onto a core layer, wherein the core layer comprises a surface roughness of at least 1.4 microns, and passing the extruded polymer layer on the core layer between at least two temperature controlled nip rollers, wherein one of the temperature controlled nip rollers comprises a pit camouflaging surface and a method of forming an imaging support comprising the steps of extruding a polymer layer, passing the extruded polymer layer between at least two temperature controlled nip rollers, wherein one of the temperature controlled nip rollers comprises a pit camouflaging surface, and laminating the polymer layer onto a core layer, wherein the core layer has a surface roughness of at least 1.4 microns.

ADVANTAGEOUS EFFECT OF THE INVENTION

This invention provides a superior imaging support. Specifically, it provides an imaging support of high stiffness, excellent smoothness, high opacity, whiteness, and excellent humidity curl resistance. It also provides an imaging support that can be manufactured using a single in-line operation. It also provides an imaging support that can be effectively recycled. It also provides an imaging support that is substantially free of "pits" in appearance, thus preserving the optical properties of the print.

DETAILED DESCRIPTION OF THE INVENTION

Figure 1:
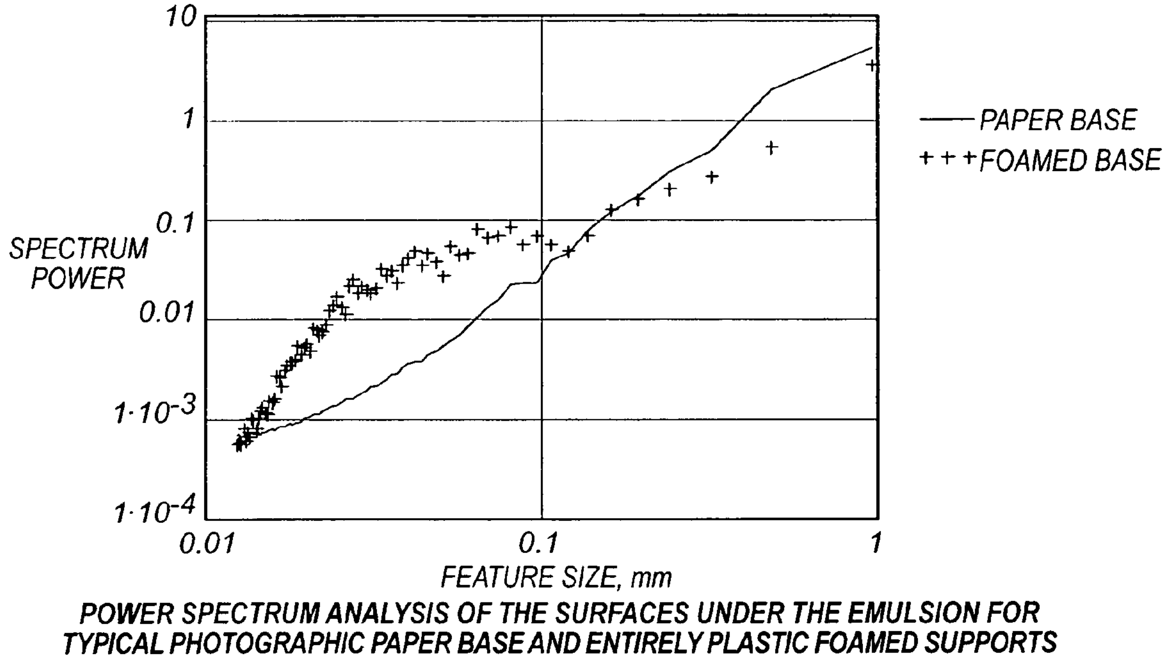
FIG. 1 depicts the power spectrum analysis of the surfaces under the emulsion for typical photographic paper supports and entirely plastic foamed supports.

An element and a method for producing imaging elements with reduced "pits" have been found. This invention uses a rough-surface core, preferably a polymer foam, with high modulus flange layers that provide stiffness, surrounding the foam core on either side. Using this approach, many new features of the imaging support may be exploited, and restrictions in manufacturing eliminated.

The terms as used herein, "top", "upper", "emulsion side", and "face" mean the side or towards the side of an imaging member bearing the imaging layers. The terms "bottom", "lower side", and "back" mean the side or towards the side of the imaging member opposite from the side bearing the imaging layers or developed image. The term "substrate" as used herein refers to a support material that is the primary part of an imaging element such as paper, polyester, vinyl, synthetic paper, fabric, or other suitable material for the viewing of images. The term "core" refers to the layer of a support providing the bulk of the thickness and stiffness in the imaging element.

The imaging element of the invention preferably comprises a polymer foam core. The foam core may optionally have adhered thereto an upper and a lower flange sheet. The polymer foam core comprises a homopolymer, such as a polyolefin, polystyrene, polyvinylchloride or other typical thermoplastic polymers, their copolymers or their blends thereof, or other polymeric systems, such as polyurethanes or polyisocyanurates, that have been expanded through the use of a blowing agent to consist of two phases: a solid polymer matrix, and a gaseous phase. Other solid phases may be present in the foams in the form of fillers that are organic, such as polymeric or fibrous fillers, or inorganic fillers, such as glass, ceramic, metal fillers. The fillers may be used for physical, optical (lightness, whiteness, and opacity), chemical, or processing property enhancement of the foam.

The foaming of these polymers may be carried out through several mechanical, chemical, or physical means. Mechanical methods include whipping a gas into a polymer melt, solution, or suspension, which then hardens either by catalytic action or heat or both, thus entrapping the gas bubbles in the matrix. Chemical methods include such techniques as the thermal decomposition of chemical blowing agents generating gases such as nitrogen or carbon dioxide by the application of heat or through exothermic heat of reaction during polymerization. Physical methods include such techniques as the expansion of a gas dissolved in a polymer mass upon reduction of system pressure, the volatilization of low-boiling liquids such as fluorocarbons or methylene chloride, or the incorporation of hollow microspheres in a polymer matrix. The choice of foaming technique is dictated by desired foam density reduction, desired properties, and manufacturing process.

In a preferred embodiment of this invention polyolefins such as polyethylene and polypropylene, their blends and their copolymers are used as the matrix polymer in the foam core along with a chemical blowing agent. Representative chemical blowing agents may include sodium bicarbonate and its mixture with citric acid, organic acid salts, azodicarbonamide, azobisformamide, azobisisobutyrolnitrile, diazoaminobenzene, 4,4'-oxybis(benzene sulfonyl hydrazide) (OBSH), N,N'-dinitrosopentamethyltetramine (DNPA), sodium borohydride, and other blowing agent agents well known in the art. The preferred chemical blowing agents are sodium bicarbonate/citric acid mixtures, and azodicarbonamide. If necessary, these foaming agents may be used together with an auxiliary foaming agent, nucleating agent, and a cross-linking agent.

The selection of core material, the extent of density reduction, that is, foaming, and the use of any additives/treatments, such as cross-linking the foam, determine the foam core modulus. The suitable range in caliper of the foam core is from 25 μm to 350 μm. The preferred caliper range is between 50 μm and 200 μm because of the preferred overall caliper range of the element which lies between 100 μm and 400 μm. Preferably, the foam core sheet has a density of from 0.4 $g/cm^3$ to 0.9 $g/cm^3$. The range in density reduction of the foam core is from 20% to 95%. The preferred range in density reduction is between 40% and 70%. This is because it is difficult to manufacture a uniform product with very high density reduction, for example, over 70%. Density reduction is the percent difference between solid polymer and a particular foam sample. It is also not economical to manufacture a product with density reduction less than 40%. In each case, the above range is preferred because of (a) consumer preference, (b) manufacturability, and (c) materials selection. It is noted that the final choice of flange and core materials, modulus, and caliper will be a subject of the target overall element stiffness and caliper.

The flange sheets used with this invention are chosen to satisfy specific requirements of flexural modulus, caliper, surface roughness, and optical properties such as colorimetry and opacity. The flange members may be formed integrally with the foam core by manufacturing the foam core with a flange skin sheet or the flange may be laminated to the foam core material. The integral extrusion of flange members with the core is preferred to reduce cost. Flange layers may be present on both sides of the support core, especially in the case of imaging layers on both surfaces, that is top/upper and bottom/lower surfaces, of the support. The lamination technique allows a wider range of properties and materials to be used for the skin materials.

The selection of flange materials and treatments, such as the addition of strength agents for the core, also referred to herein as a base, or the use of filler materials for polymeric flange materials, determines the flange modulus. Additionally, flange thickness and placement in the imaging element also may impact the overall thickness and performance of the element. The caliper of the base or core and of the high modulus polymeric material is determined by the respective flexural modulus such that the overall stiffness of the imaging element lies within the preferred range, and the bending moment around the central axis is balanced to prevent excessive curl. For example, at the low end of target stiffness, such as, 50 mN and caliper, such as, 100 μm, given a typical polyolefin foam of caliper 50 μm and modulus 137.9 MPa, the flange sheet caliper is constrained to 25 μm on each side of the core, and the flange modulus required is 10343 MPa, properties that can be met using a high modulus base. Also, for example, at the high end of target stiffness (250 mN) and caliper (400 μm), given a typical polyolefin foam of caliper 300 μm and modulus 137.9 MPa, the flange sheet caliper is constrained to 50 μm on each side and the flange modulus required is 1034 MPa, properties that can be met using a polyolefin flange sheet. The useful caliper of the flange sheets used with the invention ranges between 10 μm and 175 μm, preferably between 35 μm and 70 μm, and the modulus of the flange sheets used with the invention ranges from 700 MPa to 10500 Mpa.

In a preferred lamination embodiment of this invention, the flange sheets used comprise high modulus polymers such as high density polyethylene, polypropylene, or polystyrene, their blends or their copolymers, that have been stretched and oriented. They may be filled with suitable filler materials to increase the modulus of the polymer and enhance other properties, such as opacity and smoothness. Some of the commonly used inorganic filler materials are talc, clays, calcium carbonate, magnesium carbonate, barium sulfate, mica, aluminum hydroxide (trihydrate), wollastonite, glass fibers and spheres, silica, various silicates, and carbon black. Some of the organic fillers used are wood flour, jute fibers, sisal fibers, and polyester fibers. The preferred fillers are talc, mica, and calcium carbonate because they provide excellent modulus enhancing properties.

In another embodiment of this invention, the flange sheets used comprise paper on one side and a high modulus polymeric material on the other side. In another embodiment, an integral skin may be on one side and another skin laminated to the other side of the foam core. The element, while described as having preferably at least three layers of a foam core and a flange layer on each side, may also be provided with additional layers that may serve to change the properties of the element. Imaging elements could be formed with surface layers that would provide an improved adhesion or look. The present invention is utilized to camouflage the appearance of pits as well as the higher surface roughness of foam compared to paper bases. In addition, the application of the textured flanges of the present invention may be used on materials which have heretofore been thought to be too rough for use in imaging supports to camouflage unacceptable surface roughness.

At least one flange sheet may, in particular instances, comprise paper. The paper used with this invention can be made on a standard continuous fourdrinier wire machine or on other modern paper formers. Any pulps known in the art for producing paper may be used in this invention. Bleached hardwood chemical kraft pulp is preferred, as it provides brightness, a good starting surface, and good formation while maintaining strength. Paper flange sheets useful with this invention are of caliper between 25 μm and 100 μm, preferably between 30 μm and 70 μm because then the overall element thickness is in the range preferred by customers for imaging element and processes in existing equipment. Chemical additives may be included to impart hydrophobicity, wet strength, and dry strength. Inorganic filler materials such as $TiO_2$, talc, and $CaCO_3$ clays may be used to enhance optical properties and reduce cost. Dyes, biocides, or processing chemicals may also be used. The paper may also be subject to smoothing operations such as dry or wet calendering, as well as to coating through an in-line or an off-line paper coater.

Imaging elements are constrained to a range in stiffness and caliper. At stiffness below a certain minimum stiffness, there is a problem with the element in print stackability and print conveyance during transport through photofinishing equipment, particularly high-speed photoprocessors. It is believed that there is a minimum cross direction stiffness of 60 mN required for effective transport through photofinishing equipment. At stiffness above a certain maximum, there is a problem with the element in cutting, punching, slitting, and chopping during transport through photofinishing equipment. It is believed that there is a maximum machine direction stiffness of 300 mN for effective transport through photofinishing equipment. It is also important that the caliper of the imaging element be constrained between 75 μm and 350 μm to provide effective transport through photofinishing equipment.

Imaging elements are typically constrained by consumer performance and present processing machine restrictions to a stiffness range of between approximately 50 mN and 250 mN and a caliper range of between approximately 100 μm and 400 μm. In the design of the element of the invention, there exists a relationship between stiffness of the imaging element and the caliper and modulus of the core, especially in the case of foam core, and modulus of the flange sheets, that is, for a given core thickness, the stiffness of the element can be altered by changing the caliper of the flange elements and/or changing the modulus of the flange elements and/or changing the modulus of the foam core.

If the target overall stiffness and caliper of the imaging element are specified for a given core thickness and core material, the target caliper and modulus of the flange elements are implicitly constrained. Conversely, given a target stiffness and caliper of the imaging element for a given caliper and modulus of the flange sheets, the core thickness and core modulus are implicitly constrained.

Imaging elements must also meet constraints relating to optical properties such as opacity and colorimetry. It is sometimes necessary to add colorants to reflective imaging supports because observers differ as to what constitutes whiteness. In general, studies have shown that most observers prefer a slightly blue white, as opposed to a true white or slightly yellow white, and, hence, the inclusion of colorants that result in a slight blue hue to the imaging support, as disclosed in Principles of Color Technology, Billmeyer and Saltzman, 2nd edition, John Wiley & Sons, New York, 1981, p. 66. The same considerations of materials selection, combination, concentration, and placement also hold true when one is concerned with the opacity of a reflective support. One wishes to prevent the show through of the reflective image below the one being viewed in a stack of images or the non white surface that the reflective image is resting on or is mounted to by providing adequate opacity. Optical properties such as opacity and colorimetry may be met by the appropriate use of filler materials or whitening agents, such as titanium dioxide and calcium carbonate and colorants, tints, dyes and/or optical brighteners or other additives known to those skilled in the art. The fillers may be in the flange or an overcoat layer. Generally, support materials for color print imaging materials are white, possibly with a blue tint as a slight blue is preferred to form a preferred white look to whites in an image. Any suitable white pigment may be incorporated in the polyolefin layer such as, for example, titanium dioxide, zinc oxide, zinc sulfide, zirconium dioxide, white lead, lead sulfate, lead chloride, lead aluminate, lead phthalate, antimony trioxide, white bismuth, tin oxide, white manganese, white tungsten, and combinations thereof. The pigment is used in any form that is conveniently dispersed within the flange or resin coat layers. The preferred pigment is titanium dioxide. In addition, suitable optical brightener may be employed in the polyolefin layer including those described in *Research Disclosure*, Vol. No. 308, December 1989, Publication 308119, Paragraph V, page 998. In a preferred embodiment, the support demonstrates a percent light transmittance of less than 20%. In another preferred embodiment, the support has opacity greater than 90%. I another preferred embodiment, the imaging element has a b* UVO blueness of less than 3.50 and/or an L* of between 90.0 and 97.0.

In addition, it may be necessary to use various additives such as antioxidants, slip agents, or lubricants, and light stabilizers in the polymeric elements as well as biocides in the paper elements. These additives are added to improve, among other things, the dispersibility of fillers and/or colorants, as well as the thermal and color stability during processing and the manufacturability and the longevity of the finished article. For example, the element may contain antioxidants such as 4,4'-butylidene-bis(6-tert-butyl-meta-cresol), di-lauryl-3,3'-thiopropionate, N-butylated-p-aminophenol, 2,6-di-tert-butyl-p-cresol, 2,2-di-tert-butyl-4-methyl-phenol, N,N-disalicylidene-1,2-diaminopropane, tetra (2,4-tert-butylphenyl)-4,4'-diphenyl diphosphonite, octadecyl 3-(3',5'-di-tert-butyl-4'-hydroxyphenyl propionate), or combinations of the above, heat stabilizers, such as higher aliphatic acid metal salts such as magnesium stearate, calcium stearate, zinc stearate, aluminum stearate, calcium palmitate, zirconium octylate, sodium laurate, and salts of benzoic acid such as sodium benzoate, calcium benzoate, magnesium benzoate and zinc benzoate, light stabilizers such as hindered amine light stabilizers (HALS), of which a preferred example is poly{[6-[(1,1,3,3-tetramethylbutylamino}-1,3,5-triazine-4-piperidinyl)-imino]-1,6-hexanediyl[{2,2,6,6-tetramethyl-4-piperdinyl)imino]}(Chimassorb 944 LD/FL).

An imaging element needs to meet constraints in surface smoothness. Conventional paper base stock used in photographic and other imaging elements has a typical roughness of between 0.8–1.4 microns and when a melt extrudable layer is applied at a typical coverage of approximately 26 g/m$^2$ using a conventional glossy chill roll, the resulting surface roughness may be in the 0.15–0.3 micron roughness range. For purposes of the present invention, a glossy chill roll is defined as a chill roll having a 0.2 micron amplitude surface roughness.

At the low end of the base roughness, there are typically very few pits observed, but as the paper base approaches the upper end of the roughness range or higher more pits become visible. When a melt extrudable resin flange layer is applied to a foam core with a typical roughness of 2.4 microns using a conventional glossy chill roll and the same coverage as used with the paper base as described above, the resulting roughness is 0.3 microns with a range of between 0.14 and 3.0.

The power spectrum amplitude depicted in FIG. 1 indicates the relative surface roughness when the surface pattern is assumed to be broken into discrete lateral sizes. The diameter of “pits” ranges from 32 to 160 micron (or 0.032 to 0.16 mm) and the power spectrum roughness can be up to 10 times greater for the foamed base. In practice, the foamed base with the roughness shown here was coated with a gel photographic emulsion and was found to have an excessive number of “pits”. Normally, paper base subsequently plastic coated against a 0.2 micron amplitude chill roller and then emulsion coated has a minimal level of “pits”.

Polymer coated pits, as they are observed with high angle light using a microscope or using a non contacting surface microprobe, have an average diameter of 70 microns, with a range from 32 to 160 microns with a depth of approximately 2–4 microns. In pits observed on oriented flange-coated foam core, the pits may have a depth of over 2 microns and a length greater than 50 microns. The large length dimension is a result of the orientation of the foam core or base. The orientation process stretches the pits. Such large pits make the resulting image less desirable.

The foam core or foam layers useful in this invention have a typical surface roughness range of from 0.7 to 4.5 microns. Preferred foam core or foam core layers have a roughness of from 1.4 to 4.5 microns. The surface roughness of the chill roller that is used for the flanged surface layer on the foam core layer may be made rougher than 1.2 microns surface average roughness. The preferred surface roughness of the chill roller may have peak to valley heights of from 0.25 to 4.6 microns with a spatial frequency of the larger features, that is, peak to valley heights in the range from 1.1 to 3.4 microns, varies in a range of spatial frequency from 10 to 10,000 microns. It should be noted that other smaller features may be present in the chill roller surface but the primary spectral reflectance is achieved by the larger features. Spectral reflectance typically is a measure of angular gloss as measured by a Gardener 60 Degree gloss meter. With the wide range of surface feature roughness, the reflectance off the surface appears very matte or diffuse.

When a roller with spatial frequency from 10 to 10,000 microns and a surface roughness average of greater than 1.4 microns is contacted with the melt extruded polymer layer that has been cast on a foam core, and the resultant foamed structure is subsequently coated with an imaging layer, the product is found to be without the visual appearance of “pits”. The spatial frequency of the surface roughness of chill rollers is easily made in the range of 0.01 to 10 mm. Such a surface provides a visual noise level that produces near uniform spectral reflection from the surface and therefore eliminates or reduces the visual perception of pits.

Figure 2:
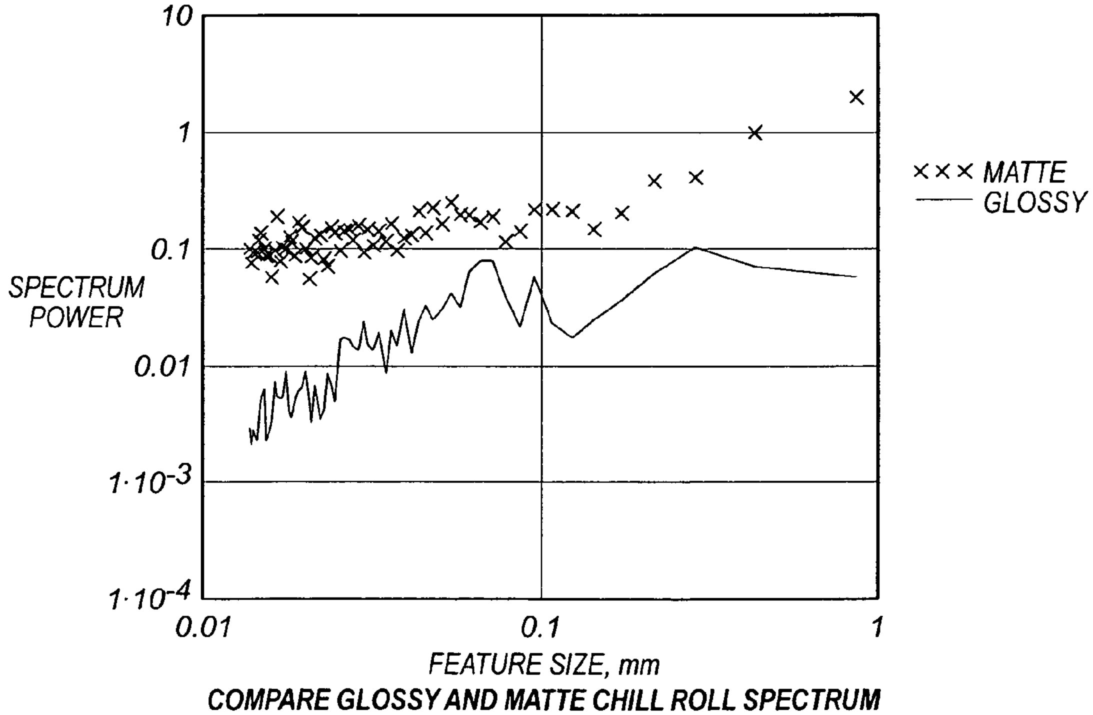
FIG. 2 illustrates a comparison between a matte and glossy chill roll spectrum.

FIG. 2 shows where the roughness energy is added, as represented by the higher values on the chart, when using a pit camouflaging roll surface compared to a glossy chill roll. The foam base has a harsh, rough appearance when covered by plastic coated against a glossy chill roll. The use of a pit camouflaging surface on the chill roll disguises the rough foam appearance. The plastic layers contacted with the surface of the roll replicate the chill roll surface topography very well. The matte spectrum of the pit camouflaging surface has a lot of hiding power because it has a lot of roughness at a spatial frequency of 0.01 to 0.1 mm compared to a glossy roll surface. FIG. 1 demonstrates that, for paper base and foamed base, this spatial frequency is where the foamed base is worse.

Surface smoothness characteristics may be met during flange-sheet manufacturing operations such as during paper making or during the manufacture of oriented polymers like oriented polystyrene. Alternatively, surface smoothness characteristics may be met by extrusion coating additional layer(s) of polymers such as polyethylene onto the flange sheets in contact with a textured chill-roll or similar technique known by those skilled in the art.

The elements of the invention can be made using several different manufacturing methods. The coextrusion, quenching, orienting, and heat setting of the element may be effected by any process known in the art for producing polymer sheet, such as a flat sheet process or a bubble or tubular process. The flat sheet process involves extruding the blend through a slit die and rapidly quenching the extruded web upon a chilled casting drum so that the foam core component of the element and the polymeric integral flange components are quenched below their glass solidification temperature. The flange components may be extruded through a multiple stream die with the outer flange forming polymer streams not containing foaming agent. Alternatively, the surface of the foaming agent containing polymer may be cooled to prevent surface foaming and form a flange. The quenched sheet may be biaxially oriented by stretching in mutually perpendicular directions at a temperature above the glass transition temperature and below the melting temperature of the matrix polymers. The sheet may be stretched in one direction and then in a second direction or may be simultaneously stretched in both directions. After the sheet has been extruded, it is heat set by heating to a temperature sufficient to crystallize or anneal the polymers.

The flange layer is melted at a temperature above its glass transition temperature (Tg) and extruded from an extrusion die. The fluid polymer is pressed against a chill roller. The chill roller has a given roughness average profile with a pattern that has a spatial frequency associated with it that has the ability to eliminated or reduce the visual presence of pits in rough imaging elements. As indicated above, the surface roughness of the chill roller that is used for the flanged surface layer on the foam core layer may be made rougher than 1.2 microns surface average roughness. The preferred surface roughness of the chill roller may have peak to valley heights of from 0.25 to 4.6 microns with a spatial frequency of the larger features, that is, peak to valley heights in the range from 1.1 to 3.4 microns, varies in a range of spatial frequency from 10 to 10,000 microns. Since the polymer is above its Tg temperature, the resin is forced to conform to the chill roll pattern and will replicate the pattern on the polymer, as a function of such variables as speed, temperature, and pressure. The resin is quickly quenched and hardened. The polymer resin collapses into the roughness features of the core or as it cools, creating pits. By imparting a roughness pattern with a given frequency to the surface of the polymer coated on the foam core, roughened surface provides background light-scattering, thereby camouflaging the pits. The visual noise created by the patterned chill roller hides or camouflages the pits.

These elements may be coated or treated after the coextrusion and optional orienting process or between casting and optional full orientation with any number of coatings which may be used to improve the properties of the sheets including printability, to provide a vapor barrier, to make them heat sealable, or to improve the adhesion to the support or to the photosensitive layers. Examples of this would be acrylic coatings for printability, coating polyvinylidene chloride for heat seal properties. Further examples include flame, plasma, or corona discharge treatment to improve printability or adhesion.

The element may also be made through the extrusion laminating process. Extrusion laminating is carried out by bringing together the paper and pre-formed roughen polymeric flange sheets used with the invention and the foam core with application of an adhesive between them, followed by their being pressed in a nip, as described in the present invention. The adhesive may be applied to either the flange sheets or the foam core prior to their being brought into the nip. In a preferred form, the adhesive is applied into the nip simultaneously with the flange sheets and the foam core. The adhesive may be any suitable material that does not have a harmful effect upon the element. A preferred material is polyethylene that is melted at the time it is placed into the nip between the foam core and the flange sheet. Addenda may also be added to the adhesive layer. Any know material used in the art to improve the optical performance of the system may be used. The use of $TiO_2$ is preferred. During the lamination process, it is desirable to maintain control of the tension of the flange sheets in order to minimize curl in the resulting laminated receiver support.

Used herein, the phrase 'imaging element' comprises an imaging support as described above along with an image receiving layer as applicable to multiple techniques governing the transfer of an image onto the imaging element. Such techniques include thermal dye transfer, electrophotographic printing, or ink jet printing, as well as a support for photographic silver halide images. As used herein, the phrase "photographic element" is a material that utilizes photosensitive silver halide in the formation of images.

The thermal dye image-receiving layer of the receiving elements used with the invention may comprise, for example, a polycarbonate, a polyurethane, a polyester, polyvinyl chloride, poly(styrene-co-acrylonitrile), poly(caprolactone), or mixtures thereof. The dye image-receiving layer may be present in any amount that is effective for the intended purpose. In general, good results have been obtained at a concentration of from 1 to 10 $g/m^2$. An overcoat layer may be further coated over the dye-receiving layer, such as described in U.S. Pat. No. 4,775,657 of Harrison et al.

Dye-donor elements that are used with the dye-receiving element used in the invention conventionally comprise a support having thereon a dye containing layer. Any dye can be used in the dye-donor employed in the invention, provided it is transferable to the dye-receiving layer by the action of heat. Especially good results have been obtained with sublimable dyes. Dye donors applicable for use in the present invention are described, e.g., in U.S. Pat. Nos. 4,916,112, 4,927,803, and 5,023,228. As noted above, dye-donor elements are used to form a dye transfer image. Such a process comprises image-wise-heating a dye-donor element and transferring a dye image to a dye-receiving element as described above to form the dye transfer image. In a preferred embodiment of the thermal dye transfer method of printing, a dye donor element is employed which compromises a poly(ethylene terephthalate) support coated with sequential repeating areas of cyan, magenta, and yellow dye, and the dye transfer steps are sequentially performed for each color to obtain a three-color dye transfer image. When the process is only performed for a single color, a monochrome dye transfer image is obtained.

Thermal printing heads which can be used to transfer dye from dye-donor elements to receiving elements used with the invention are available commercially. There can be employed, for example, a Fujitsu Thermal Head (FTP-040 MCS001), a TDK Thermal Head F415 HH7-1089, or a Rohm Thermal Head KE 2008-F3. Alternatively, other known sources of energy for thermal dye transfer may be used, such as lasers as described in, for example, GB No. 2,083,726A.

A thermal dye transfer assemblage useful in the invention comprises (a) a dye-donor element, and (b) a dye-receiving element as described above, the dye-receiving element being in a superposed relationship with the dye-donor element so that the dye layer of the donor element is in contact with the dye image-receiving layer of the receiving element.

When a three-color image is to be obtained, the above assemblage is formed on three occasions during the time when heat is applied by the thermal printing head. After the first dye is transferred, the elements are peeled apart. A second dye-donor element, or another area of the donor element with a different dye area, is then brought in register with the dye-receiving element and the process repeated. The third color is obtained in the same manner.

The electrographic and electrophotographic processes and their individual steps have been well described in the prior art. The processes incorporate the basic steps of creating an electrostatic image, developing that image with charged, colored particles, for example, toner, optionally transferring the resulting developed image to a secondary substrate, and fixing the image to the substrate. There are numerous variations in these processes and basic steps, the use of liquid toners in place of dry toners is simply one of those variations.

The first basic step, creation of an electrostatic image, can be accomplished by a variety of methods. The electrophotographic process of copiers uses imagewise photodischarge, through analog or digital exposure, of a uniformly charged photoconductor. The photoconductor may be a single-use system, or it may be rechargeable and reimageable, like those based on selenium or organic photoreceptors.

In an alternate electrographic process, electrostatic images are created ionographically. The latent image is created on dielectric (charge-holding) medium, such as paper, film or other support. Voltage is applied to selected metal styli or writing nibs from an array of styli spaced across the width of the medium, causing a dielectric breakdown of the air between the selected styli and the medium. Ions are created, which form the latent image on the medium.

Electrostatic images, however generated, are developed with oppositely charged toner particles. For development with liquid toners, the liquid developer is brought into direct contact with the electrostatic image. Usually a flowing liquid is employed to ensure that sufficient toner particles are available for development. The field created by the electrostatic image causes the charged particles, suspended in a nonconductive liquid, to move by electrophoresis. The charge of the latent electrostatic image is thus neutralized by the oppositely charged particles. The theory and physics of electrophoretic development with liquid toners are well described in many books and publications.

If a reimageable photoreceptor or an electrographic master is used, the toned image is transferred to paper or other substrate/support. The support is charged electrostatically, with the polarity chosen to cause the toner particles to transfer to the support. Finally, the toned image is fixed to the support. For self-fixing toners, residual liquid is removed from the support by air-drying or heating. Upon evaporation of the solvent, these toners form a film bonded to the support. For heat-fusible toners, thermoplastic polymers are used as part of the particle. Heating both removes residual liquid and fixes the toner to support.

When used as ink jet imaging media, the recording elements or media typically comprise a substrate or a support material having on at least one surface thereof an ink-receiving or image-forming layer. If desired, in order to improve the adhesion of the ink receiving layer to the support, the surface of the support may be corona-discharge-treated prior to applying the solvent-absorbing layer to the support or, alternatively, an undercoating, such as a layer formed from a halogenated phenol or a partially hydrolyzed vinyl chloride-vinyl acetate copolymer, can be applied to the surface of the support. The ink receiving layer is preferably coated onto the support layer from water or water-alcohol solutions at a dry thickness ranging from 3 to 75 micrometers, preferably 8 to 50 micrometers.

Any known ink jet receiver layer can be used in combination with the external polyester-based barrier layer use with the present invention. For example, the ink receiving layer may consist primarily of inorganic oxide particles such as silicas, modified silicas, clays, aluminas, fusible beads such as beads comprised of thermoplastic or thermosetting polymers, non-fusible organic beads, or hydrophilic polymers such as naturally-occurring hydrophilic colloids and gums such as gelatin, albumin, guar, xantham, acacia, chitosan, starches and their derivatives, derivatives of natural polymers such as functionalized proteins, functionalized gums and starches, and cellulose ethers and their derivatives, and synthetic polymers such as polyvinyloxazoline, polyvinylmethyloxazoline, polyoxides, polyethers, poly(ethylene imine), poly(acrylic acid), poly(methacrylic acid), n-vinyl amides including polyacrylamide and polyvinylpyrrolidone, and poly(vinyl alcohol), its derivatives and copolymers, and combinations of these materials. Hydrophilic polymers, inorganic oxide particles, and organic beads may be present in one or more layers on the substrate and in various combinations within a layer.

A porous structure may be introduced into ink receiving layers comprised of hydrophilic polymers by the addition of ceramic or hard polymeric particulates, by foaming or blowing during coating, or by inducing phase separation in the layer through introduction of non-solvent. In general, it is preferred for the support layer to be hydrophilic, but not porous. This is especially true for photographic quality prints, in which porosity may cause a loss in gloss. In particular, the ink receiving layer may consist of any hydrophilic polymer or combination of polymers with or without additives as is well known in the art.

If desired, the ink receiving layer can be overcoated with an ink-permeable, anti-tack protective layer such as, for example, a layer comprising a cellulose derivative or a cationically-modified cellulose derivative or mixtures thereof. An especially preferred overcoat is poly β-1,4-anhydro-glucose-g-oxyethylene-g-(2'-hydroxypropyl)-N,N-dimethyl-N-dodecylammonium chloride. The overcoat layer is non porous, but is ink permeable and serves to improve the optical density of the images printed on the element with water-based inks. The overcoat layer can also protect the ink receiving layer from abrasion, smudging, and water damage. In general, this overcoat layer may be present at a dry thickness of 0.1 to 5 μm, preferably 0.25 to 3 μm.

In practice, various additives may be employed in the ink receiving layer and overcoat. These additives include surface active agents such as surfactant(s) to improve coatability and to adjust the surface tension of the dried coating, acid or base to control the pH, antistatic agents, suspending agents, antioxidants, hardening agents to cross-link the coating, antioxidants, UV stabilizers, and light stabilizers. In addition, a mordant may be added in small quantities, for example, 2%–10% by weight of the support layer, to improve waterfastness. Useful mordants are disclosed in U.S. Pat. No. 5,474,843.

The layers described above, including the ink receiving layer and the overcoat layer, may be coated by conventional coating means onto a transparent or opaque support material commonly used in this art. Coating methods may include, but are not limited to, blade coating, wound wire rod coating, slot coating, slide hopper coating, gravure, and curtain coating. Some of these methods allow for simultaneous coatings of both layers, which is preferred from a manufacturing economic perspective.

The DRL (dye receiving layer) is coated over the tie layer (TL) at a thickness ranging from 0.1–10 μg/m, preferably 0.5–5 μm. There are many known formulations which may be useful as dye receiving layers. The primary requirement is that the DRL is compatible with the inks which it will be imaged so as to yield the desirable color gamut and density. As the ink drops pass through the DRL, the dyes are retained or mordanted in the DRL, while the ink solvents pass freely through the DRL and are rapidly absorbed by the TL. Additionally, the DRL formulation is preferably coated from water, exhibits adequate adhesion to the TL, and allows for easy control of the surface gloss.

For example, Misuda et al in U.S. Pat. Nos. 4,879,166, 5,264,275, 5,104,730, 4,879,166, and Japanese Patents 1,095,091, 2,276,671, 2,276,670, 4,267,180, 5,024,335, and 5,016,517 disclose aqueous based DRL formulations comprising mixtures of psuedo-bohemite and certain water soluble resins. Light in U.S. Pat. Nos. 4,903,040, 4,930,041, 5,084,338, 5,126,194, 5,126,195, and 5,147,717 discloses aqueous-based DRL formulations comprising mixtures of vinyl pyrrolidone polymers and certain water-dispersible and/or water-soluble polyesters, along with other polymers and addenda. Butters et al in U.S. Pat. Nos. 4,857,386 and 5,102,717 disclose ink-absorbent resin layers comprising mixtures of vinyl pyrrolidone polymers and acrylic or methacrylic polymers. Sato et al in U.S. Pat. No. 5,194,317 and Higuma et al in U.S. Pat. No. 5,059,983 disclose aqueous-coatable DRL formulations based on poly(vinyl alcohol). Iqbal in U.S. Pat. No. 5,208,092 discloses water-based DRL formulations comprising vinyl copolymers which are subsequently cross-linked. In addition to these examples, there may be other known or contemplated DRL formulations which are consistent with the aforementioned primary and secondary requirements of the DRL, all of which fall under the spirit and scope of the current invention.

The preferred DRL is 0.1–10 micrometers thick and is coated as an aqueous dispersion of 5 parts alumoxane and 5 parts poly(vinyl pyrrolidone). The DRL may also contain varying levels and sizes of matting agents for the purpose of controlling gloss, friction, and/or fingerprint resistance, surfactants to enhance surface uniformity and to adjust the surface tension of the dried coating, mordanting agents, antioxidants, UV absorbing compounds, and light stabilizers.

Although the ink-receiving elements as described above can be successfully used to achieve the objectives of the present invention, it may be desirable to overcoat the DRL for the purpose of enhancing the durability of the imaged element. Such overcoats may be applied to the DRL either before or after the element is imaged. For example, the DRL can be overcoated with an ink-permeable layer through which inks freely pass. Layers of this type are described in U.S. Pat. Nos. 4,686,118, 5,027,131, and 5,102,717. Alternatively, an overcoat may be added after the element is imaged. Any of the known laminating films and equipment may be used for this purpose. The inks used in the aforementioned imaging process are well known, and the ink formulations are often closely tied to the specific processes, that is, continuous, piezoelectric, or thermal. Therefore, depending on the specific ink process, the inks may contain widely differing amounts and combinations of solvents, colorants, preservatives, surfactants, and humectants. Inks preferred for use in combination with the image recording elements of the present invention may be water-based, such as those currently sold for use in the Hewlett-Packard Desk Writer 560C printer. However, it is intended that alternative embodiments of the image-recording elements as described above, which may be formulated for use with inks which are specific to a given ink-recording process or to a given commercial vendor, fall within the scope of the present invention.

Smooth opaque supports are useful in combination with silver halide images because the contrast range of the silver halide image is improved, and show through of ambient light during image viewing is reduced. The preferred photographic element useful in this invention is directed to a silver halide photographic element capable of excellent performance when exposed by either an electronic printing method or a conventional optical printing method. An electronic printing method comprises subjecting a radiation sensitive silver halide emulsion layer of a recording element to actinic radiation of at least $10^{-4}$ ergs/cm$^2$ for up to 100 μ seconds duration in a pixel-by-pixel mode wherein the silver halide emulsion layer is comprised of silver halide grains as described above. A conventional optical printing method comprises subjecting a radiation sensitive silver halide emulsion layer of a recording element to actinic radiation of at least $10^{-4}$ ergs/cm$^2$ for $10^{-3}$ to 300 seconds in an imagewise mode wherein the silver halide emulsion layer is comprised of silver halide grains as described above. In a preferred embodiment, a radiation-sensitive emulsion may be used with the present invention, which comprises silver halide grains (a) containing greater than 50 mole percent chloride based on silver, (b) having greater than 50 percent of their surface area provided by {100} crystal faces, and (c) having a central portion accounting for from 95 to 99 percent of total silver and containing two dopants selected to satisfy each of the following class requirements: (i) a hexacoordination metal complex which satisfies the formula:

$$[ML_6]^n \qquad (I)$$

wherein n is zero, −1, −2, −3, or −4, M is a filled frontier orbital polyvalent metal ion, other than iridium, and $L_6$ represents bridging ligands which can be independently selected, provided that at least four of the ligands are anionic ligands, and at least one of the ligands is a cyano ligand or a ligand more electronegative than a cyano ligand, and (ii) an iridium coordination complex containing a thiazole or substituted thiazole ligand. Preferred photographic imaging layer structures are described in EP Publication 1 048 977.

The photosensitive imaging layers described therein provide particularly desirable images on the support used in this invention.

The following examples illustrate the practice of this invention. They are not intended to be exhaustive of all possible variations of the invention. Parts and percentages are by weight unless otherwise indicated.

EXAMPLES

Sample 1 (Control): Paper Sample

A paper base was produced using a standard fourdrinier paper machine and a blend of mostly bleached hardwood Kraft fibers. The fiber ratio consisted primarily of bleached poplar (38%) and maple/beech (37%) with lesser amounts of birch (18%) and softwood (7%). Fiber length was reduced from 0.73 mm length weighted average as measured by a Kajaani FS-200 to 0.55 mm length using high levels of conical refining and low levels of disc refining. Fiber lengths from the slurry were measured using a FS-200 Fiber Length Analyzer (Kajaani Automation Inc.). Energy applied to the fibers as indicated by the total Specific Net Refining Power (SNRP) was 127 KW hr/metric ton. Two conical refiners were used in series to provide the total conical refiners SNRP value. This value was obtained by adding the SNRPs of each conical refiner. Two disc refiners were similarly used in series to provide a total Disk SNRP. Neutral sizing chemical addenda, utilized on a dry weight basis, included alkyl ketene dimer at 0.20% addition, cationic starch (1.0%), polyaminoamide epichlorhydrin (0.50%), polyacrylamide resin (0.18%), diaminostilbene optical brightener (0.20%), and sodium bicarbonate. Surface sizing using hydroxyethylated starch and sodium chloride was also employed. In the third dryer section, ratio drying was utilized to provide a moisture bias from the face side to the wire side of the sheet. The top or face side (emulsion side) of the sheet was then remoisturized with conditioned steam immediately prior calendering. Sheet temperatures were raised to between 76° C. and 93° C. just prior to and during calendering. The paper was then calendered to an apparent density of 1.17. Moisture levels after the calender were 7.0% to 9.0% by weight. The paper based used had a roughness of approximately 1.4 microns.

The typical photographic paper base of approximately 160 g/m$^2$ of photo quality paper was coated with 25.9 g/m of pigmented low density polyethylene (0.917 g/cc) on the top side. This layer contained approximately 12% by weight of anatase $TiO_2$, an optical brightener and blue tints. On the backside of the paper base was a layer of 28 g/m$^2$ of clear high density (0.924 g/cc) polyethylene. A continuous antistatic layer was coated on the backside polyethylene resin by a gravure coating process.

Sample 2 (Control): Foam Core with Flange Layer

A closed cell polypropylene foam of caliper 6.0 mil and density 0.53 g/cm$^3$ was obtained from Berwick Industries, Berwick, Pa. The surface roughness of the foam core was between 2.4 and 3.3 microns. It was measured with a Taylor Hobson Surtronic 3 profilmeter with a ball tip radius of 0.2 micron. This foam was extrusion resin coated on both sides using a flat sheet die. The upper flange or polymer layer on the face side of the foam was coextrusion coated. The layer closer to the foam was coated at 13.9 g/m$^2$ coverage, at a melt temperature of 525° F., and comprised approximately 10% anatase $TiO_2$, 20% Mistron CB Talc (from Luzenac America), 20% PA609 (amorphous organic polymer from Exxon Mobil) and 50% PF611 (polypropylene homopolymer—extrusion coating grade from Basell). The skin layer, or layer coated furthest from the foam core, was coated at 12 g/m$^2$ coverage, at a melt temperature of 300 C, and comprised approximately 18% $TiO_2$, 4.5% ZnO, and 78.5% D4002 P (low density polyethylene from Eastman Chemical Company). The lower flange or polymer layer on the wire side of the foam was monoextrusion coated at 300 C melt temperature. The lower flange coating was at 28 g/m$^2$ coverage and comprised approximately 10% anatase $TiO_2$, 20% Mistron CB Talc, 20% PA609 and 50% PF611. The melt extruded polypropylene was extruded from a coathanger flat sheet die. The polymer was extruded into a nip formed by a conventional glossy chill roller and a pressure roller with the polypropylene foam core sheet being the primary web substrate that was against the pressure roller and the molten polypropylene flange against the chill roller surface. A chill roller with a 0.2 micron amplitude surface roughness is usually referred to as a "glossy" surface roller.

Sample 3 (Control): Foam Core with Thicker Flange Layers

This sample was the same as example 2 except the total resin coated flange coverage was 48.9 g/m$^2$ on the face side and 50 g/m$^2$ on the non-image side.

Sample 4 (Comparison): Paper

This sample was prepared the same as sample 1 except that chiller roller surface had a roughness that provided uniform spectral reflection. That is, the surface roughness range of the chill roller had peak to valley heights of between 0.25–4.6 microns with an average 1.27 micron amplitude surface roughness with a spatial frequency of the larger features (1.1–4.6 microns) in a range of spatial frequency between 10–10,000 microns.

Sample 5 (Invention)

This sample was prepared the same as sample 4 except that the foam core used in sample 2 was used in place of the paper core.

TABLE 1

| Sample | Face Flange Coverage (G/m2) | Base or Core roughness (Microns) | Base Core Type | Flange Roughness (Microns) | Pits |
|---|---|---|---|---|---|
| 1 (Control) | 25.9 | 1.4 | Paper | 0.14 | None |
| 2 (Control) | 25.9 | 2.5 | Foam | 0.33 | Yes |
| 3 (Control with Thicker Flanges) | 48.9 | 2.5 | Foam | 0.19 | Less than sample #2 |
| 4 (Comparison) | 25.9 | 1.4 | Paper | .31 | None |
| 5 (Invention) | 25.9 | 2.5 | Foam | 0.41 | None |

As noted in the results from Table 1, sample 1, which is a convention control paper sample, had no visual pits but when a rough foam core is substituted as demonstrated by sample 2, the pit level was very high. Sample 3 shows the smoothing effect of increasing the top side flange coverage. This conventional photographic base and, as can be seen, there are no pits observed. Sample 5 provides a typical low top-side flange coverage according to the present invention and, as noted, there is no visual perception of pits.

The presence of pits was determined by visual examination of the imaging support surface before and after the image layer was applied. In all cases a conventional color photographic image layer was applied, exposed and processed to maximum density (Black) to enhance the ability to observe pits. The samples were visually examined under a variety of overhead and low angle side lighting conditions.

The invention claimed is:

1. An imaging element comprising at least one imaging layer and a support, wherein said support comprises a layer having a surface roughness of at least 1.4 microns and at least one pit camouflaging flange layer between said support and said imaging layer, wherein the spatial frequency of surface features, having peak to valley heights in the range from 1.1 to 3.4 microns, in said pit camouflaging flange layer is from 0.01 mm to 10 mm and wherein said imaging element has a surface roughness of less than 1.1 μm.

2. The imaging element of claim 1 wherein said layer having a surface roughness of at least 1.4 microns comprises a core layer.

3. The imaging element of claim 2 wherein said core layer comprises a closed cell foam core layer and wherein said closed cell foam core layer comprises a polymer that has been expanded through the use of a blowing agent.

4. The imaging element of claim 3 wherein said polymer comprises a homopolymer.

5. The imaging element of claim 3 wherein said foam core layer comprises at least one member selected from the group consisting of polyolefin, polystyrene, polyvinylchloride, thermoplastic polymers, polyurethanes, polyisocyanurates, their copolymers or their blends thereof.

6. The imaging element of claim 3 wherein said foam core layer comprises polyolefin.

7. The imaging element of claim 3 wherein said foam core layer comprises polyethylene or polypropylene.

8. The imaging element of claim 3 wherein said blowing agent comprises a mechanical, chemical, or physical blowing agent.

9. The imaging element of claim 3 further comprising fillers.

10. The imaging element of claim 3 wherein the said foam core sheet has a stiffness of between 50 mN and 250 mN.

11. The imaging element of claim 3 wherein the said foam core sheet has a density of between 0.4 $g/cm^3$ and 0.9 $g/cm^3$.

12. The imaging element of claim 3 wherein the said foam core sheet has a matrix volume of between 40 and 70%.

13. The imaging element of claim 2 wherein said support comprises a flange sheet on a side of said core layer opposite said imaging layer.

14. The imaging element of claim 13 wherein said flange sheet on a side of said core layer opposite said imaging layer comprises paper.

15. The imaging element of claim 1 wherein said layer having a surface roughness of at least 1.4 micron comprises a surface roughness of from 1.4 to 4.5 microns.

16. The imaging element of claim 1 wherein said flange layer comprises polyolefin polymer.

17. The imaging element of claim 1 wherein said flange layer comprises at least one member selected from the group consisting of high density polyethylene, polypropylene, or polystyrene, their blends or their copolymers.

18. The imaging element of claim 1 wherein the said flange layer comprises an oriented polymer layer.

19. The imaging element of claim 18 wherein said flange layer comprises a biaxially oriented polymer sheet.

20. The imaging element of claim 1 further comprising an optical brightener in said flange layer.

21. The imaging element of claim 1 wherein the surface roughness of the flange layer on said foam core layer is greater than 1.2 microns surface average roughness.

22. The imaging element of claim 1 wherein said at least one imaging layer comprises at least one photosensitive silver halide layer.

23. The imaging element of claim 1 wherein said at least one imaging layer comprises an ink jet receiving layer.

24. The imaging element of claim 1 wherein said at least one imaging layer comprises a thermal dye receiving layer.

25. The imaging element of claim 1 further comprising a whitening agent.

26. The imaging element of claim 25 wherein said whitening agent comprises at least one inorganic compound.

27. The imaging element of claim 26 wherein said inorganic compound is selected from the group consisting of $TiO_2$, $CaCO_3$, clay, and talc.

28. The imaging element of claim 25 wherein said whitening agent is located in said flange layer.

29. The imaging element of claim 25 wherein said whitening agent is in said layer having a surface roughness of at least 1.4 microns.

30. The imaging element of claim 1 further comprising a core layer attached to a side of said layer having a surface roughness of at least 1.4 microns opposite said imaging layer.

* * * * *